US008666052B2

(12) United States Patent
Parandekar et al.

(10) Patent No.: US 8,666,052 B2
(45) Date of Patent: Mar. 4, 2014

(54) UNIVERSAL PHONE NUMBER FOR CONTACTING GROUP MEMBERS

(75) Inventors: Amey Parandekar, Kirkland, WA (US);
Dhigha Sekaran, Redmond, WA (US);
Shahzaib Younis, Redmond, WA (US);
Scott A. Plette, Kirkland, WA (US);
Marcelo D. Truffat, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 13/233,200

(22) Filed: Sep. 15, 2011

(65) Prior Publication Data

US 2013/0070912 A1  Mar. 21, 2013

(51) Int. Cl.
*H04M 3/42* (2006.01)
(52) U.S. Cl.
USPC ........... 379/211.01; 379/88.12; 379/88.22; 455/412.2; 455/417
(58) Field of Classification Search
USPC ....... 379/88.05, 88.22, 212.01, 221.07, 67.1, 379/68, 88.11–88.13, 88.18, 88.23–88.27, 379/201.11, 211.01–214.01; 455/413, 417, 455/412.1–412.2, 519
See application file for complete search history.

(56) References Cited

U.S. PATENT DOCUMENTS

| | | | |
|---|---|---|---|
| 5,664,010 A * | 9/1997 | Walker et al. | 379/221.07 |
| 5,960,340 A * | 9/1999 | Fuentes | 455/417 |
| 6,067,350 A | 5/2000 | Gordon | |
| 6,115,613 A * | 9/2000 | Jonsson | 455/519 |
| 6,246,871 B1 * | 6/2001 | Ala-Laurila | 455/413 |
| 6,934,377 B2 * | 8/2005 | Bezner et al. | 379/212.01 |
| 2005/0031096 A1 * | 2/2005 | Postrel | 379/88.22 |
| 2007/0269023 A1 | 11/2007 | Klauer et al. | |
| 2008/0214253 A1 | 9/2008 | Gillo et al. | |
| 2010/0250592 A1 | 9/2010 | Paquet et al. | |

OTHER PUBLICATIONS

Barnes, Bob, "UC Goes Mobile in the Cloud", Retrieved at <<http://www.tmcnet.com/ucmag/features/articles/114528-uc-goes-mobile-the-cloud.htm>>, Oct. 1, 2010, pp. 3.
"PBX in the Cloud or Cell Phones for Business 2.0?", Retrieved at <<http://www.technologyevangelist.com/2007/11/pbx_in_the_cloud_or.html>>, Nov. 8, 2008, pp. 4.

(Continued)

*Primary Examiner* — Md S Elahee
(74) *Attorney, Agent, or Firm* — Sonia Cooper; David Andrews; Micky Minhas

(57) ABSTRACT

A universal phone number is provided for connecting to communication methods, including fixed line, mobile line, and internet communication methods. A communication group of communication methods may include multiple communication methods belonging to one individual or to multiple individuals within the communication group, such as a family. The universal phone number may be designated as the primary contact number for the communication group such incoming phone calls and text messages may be automatically routed to the communication methods in the communication group. The universal phone number may provide alerts to the multiple communication methods for notifying when incoming phone calls are answered. A universal voicemail box may also be provided for a scenario when the incoming call is not answered. Additionally, the universal phone number may provide the ability to keep the contact information for each of the individual communication methods private.

20 Claims, 6 Drawing Sheets

(56) References Cited

OTHER PUBLICATIONS

"Personal 'cloud phone' service for rural users without a handset", Retrieved at <<http://www.springwise.com/telecom_mobile/movirtu/>>, Sep. 13, 2010, pp. 3.

Strohmeyer, Robert, "Cloud Phone Services Offer Flexible Calling Options", Retrieved at <<http://www.pcworld.com/article/227982/cloud_phone_services_offer_flexible_calling_options.html#tk.mod_rel>>, May 30, 2011, pp. 3.

* cited by examiner

UNIVERSAL PHONE NUMBER FOR CONTACTING GROUP MEMBERS

BACKGROUND

Modern communication systems provide multiple communication methods for getting in touch with a person, such as home telephones, work telephones, cellular telephones, automobile console telephones, internet telephones and email. Typically, in order to get in touch with an individual, it may be necessary to dial each of the communication devices separately until the individual answers one of the devices. Further, in many cases, each communication device may include a voicemail box, where a caller may leave a message for the called individual. If the called individual does not answer at any of the communication devices, the caller may deposit a voicemail at each of the respective voicemail boxes, often times resulting in multiple nearly identical messages on multiple voicemail boxes. Consequently, the called individual may have called each voicemail box separately using the specific voicemail box phone number and pass-code and may be required to listen to the nearly identical messages multiple times on each voicemail box.

Additionally, multiple members of a group, such as a family, may use multiple communication methods. A group, like a family, may have a home phone, two work phones, two cell phones, two mobile phones and two email addresses, resulting in multiple devices that callers may call in order to get in touch with a family member. In an example scenario, if a doctor, school, bank or security monitoring system needs to get in touch with a family or group member, they must call each of the communication devices separately until one is answered. This may result in wasted time by the caller when trying to get in touch with the family member, and wasted time by the family members when trying to check multiple voicemails to determine who has called each of the communication devices and managing the voicemail messages.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a universal phone number for connecting to members of a group using a variety of communication methods, such as landline, mobile line, Internet-based communication methods, and similar ones. Members of the group may wish to be contacted through different methods (voice call, email, text message, etc.) during various times of day or depending on who is calling. The universal phone number may be designated as the primary contact number for the communication group such that an incoming communication request, such as a phone call or a text message, may be automatically routed to a member of group linked to the universal phone number. The incoming communication request may be directed to the requested member, another member, or to multiple members at the same time based on rules defined by the group members. Each routing may involve the same or different communication methods. The universal phone number may also provide alerts to one or more members notifying them of the status of the incoming communication requests. A universal voicemail box may also be provided for a scenario when the incoming call is not answered. The universal phone number may provide the ability to keep the contact information for each of the individual communication methods private by automatically routing incoming communication requests to the universal phone number to the members.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
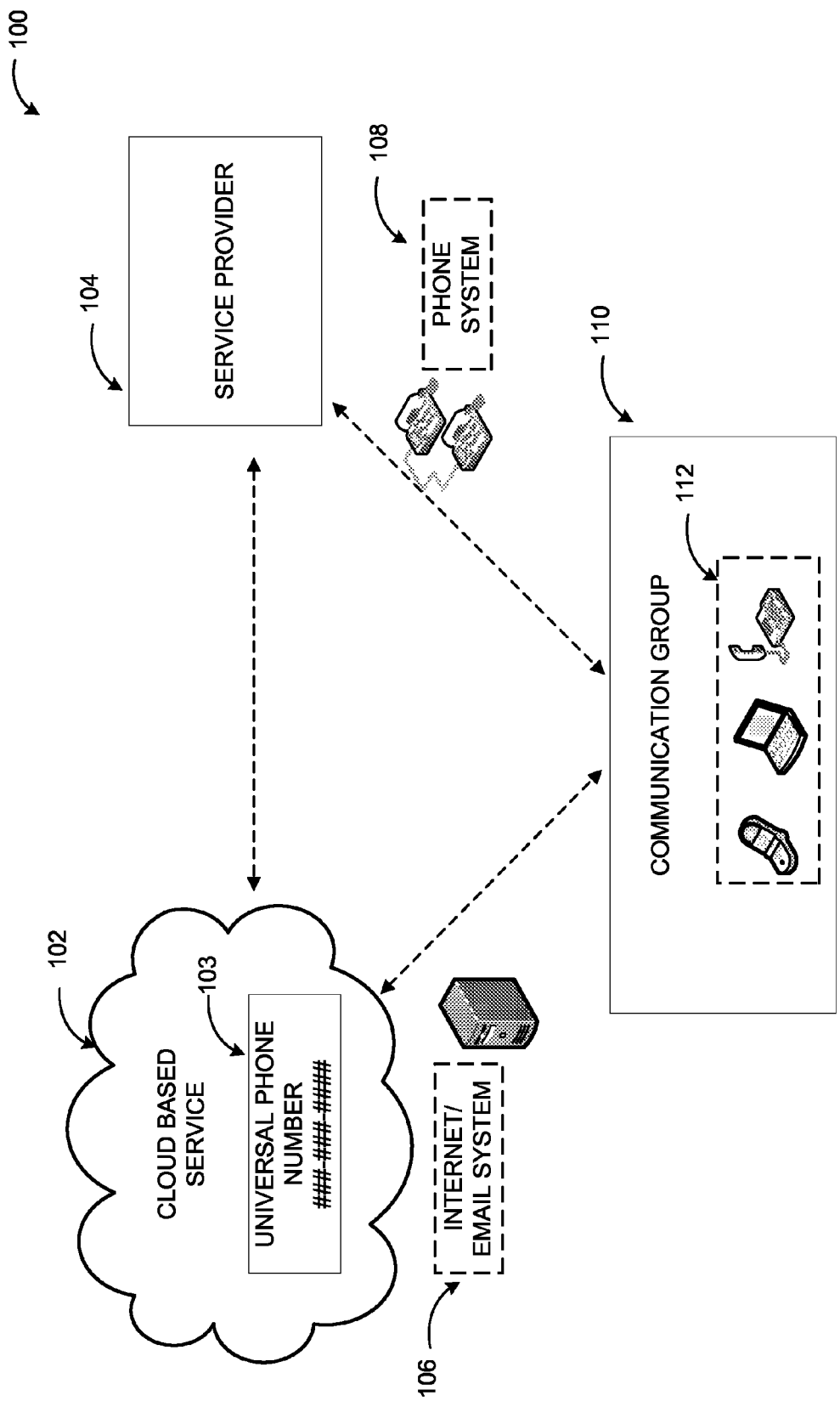
FIG. 1 illustrates a system for providing a universal phone number for contacting a group, according to embodiments.

As briefly described above, a universal phone number is provided for connecting to a multiple-member group employing a variety of communication methods. A group such as a family may designate the universal phone number as the primary contact number such that incoming phone calls, text messages, and comparable communication requests may be automatically routed to the members of the communication group, while maintaining the privacy of the contact information of the individual members. The universal phone number may provide alerts to the multiple members for notifying when incoming phone calls are answered. A universal voicemail box may also be provided for a scenario when the incoming calls are not answered.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing multi-modal communication services. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates a system for providing a universal phone number for contacting a group, according to embodiments. A system according to embodiments may enable members of a group to be contacted using a single universal phone number. In a system according to embodiments, a cloud based service 102 may be utilized to associate a universal phone number 103 with one or more communication methods 112, such as for example, a mobile phone number, a work phone number, a home phone number, a voice over Internet protocol (VOIP) phone, an email address, and text messaging address, etc. that may be used to reach one or more members in a communication group 110.

The cloud based service 102 may be configured to assign the universal phone number 103 to the communication group 110 such that the universal phone number 103 may be used to reach any member of the communication group 110 using a variety of different communication methods 112. The cloud based service 102 may be linked with the communication group 110 such that when the universal phone number 103 is dialed by a caller, the cloud based service 102 may automatically route the incoming call to one or more of the communication methods 112 within the communication group 110 that have been associated with the universal phone number 103 according to rules defined by the members. The universal phone number 103 may provide the ability to keep the contact information (e.g. phone numbers and email addresses) for each of the members private, such that group members may provide the universal phone number 103 as a contact number, and may keep individual communication method contact information private.

In a system according to embodiments, members of a family, association, business organization, or similar entity may be linked together as the communication group 110. The communication group 110 may include a plurality of communication methods 112 belonging to one person, such as the person's work phone, home phone, mobile phone and email address. In another embodiment, the communication group 110 may include multiple group members and multiple communication methods 112 belonging to each of the members of the communication group 110, such as a first member's mobile phone and email address and a second member's work phone, cell phone, home phone and email address.

In a system according to embodiments, the cloud based service 102 may be connected with the communication group 110 over an internet/email/voice over internet protocol (VOIP) system 106 for sending alerts and notifications to internet communication methods. The cloud based service 102 may also be connected over a telephone system 108 for routing incoming calls to telephony communication methods, which may be provided by a service provider 104 associated with the cloud based service 102. Utilizing the internet/email system 106, the cloud based service 102 may be able to connect the universal phone number 103 to an email address, a (VOIP) destination, and other internet communication methods within the communication group 110 that have been associated with the universal phone number 103. Similarly, using the telephone system 108, the cloud based service 102 may connect the universal phone number 103 though the service provider 104 to a plurality of telephony communication methods, such as landline devices and mobile devices, including smart phones, work pones and home phones.

Figure 2:
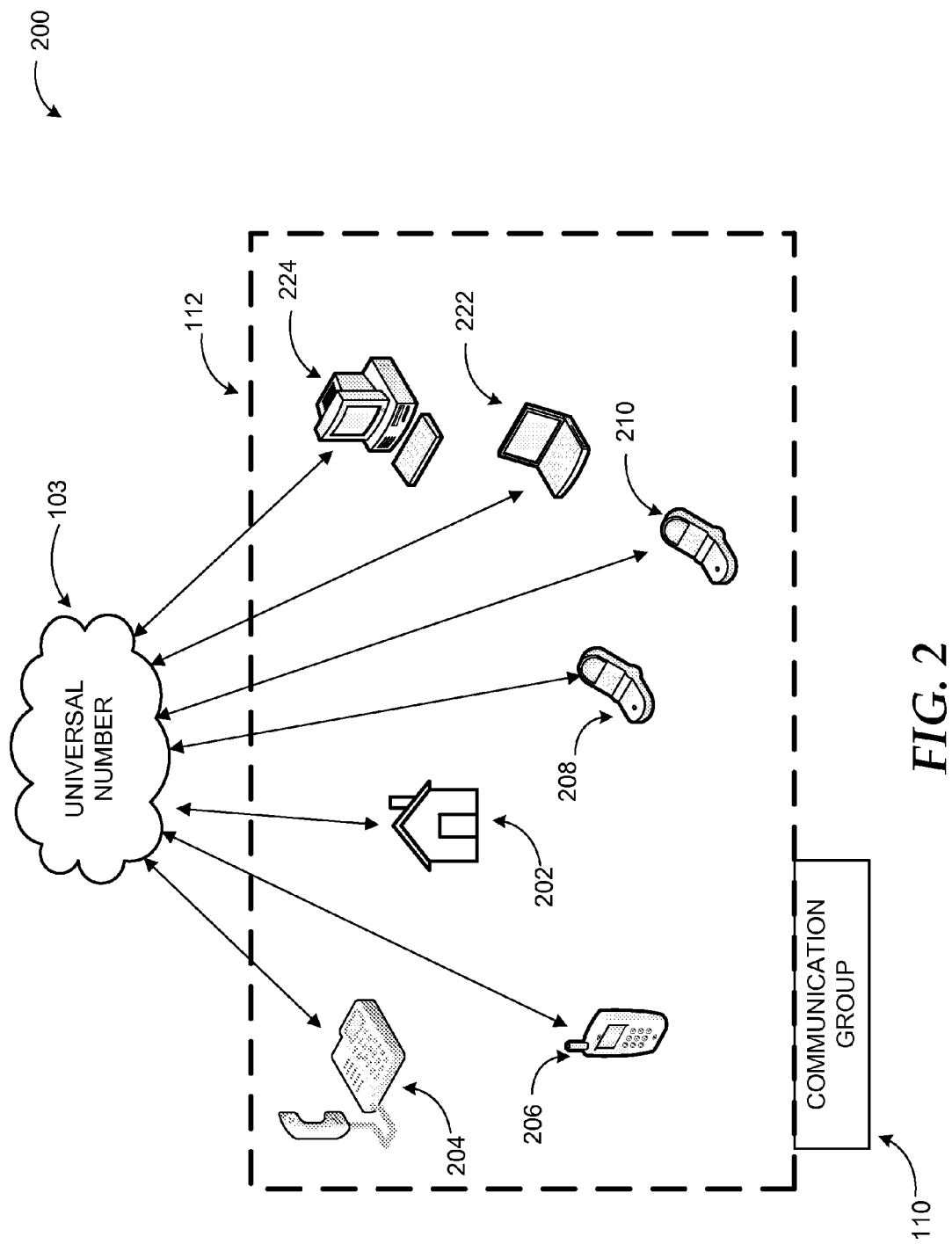
FIG. 2 illustrates an example communication group associated with a universal phone number, according to embodiments.

FIG. 2 illustrates an example communication group 110 associated with a universal phone number, according to embodiments. As demonstrated in FIG. 2, in an example embodiment, a universal communication network may include a variety of communication methods 112 including, for example, a home phone 202, cellular phones 208 and 210, a work phone 204, mobile device 206, internet phone 224, and email addresses 222 associated with members of the communication group 110. Typically, in a traditional calling environment, if a person needs to contact one of the group members, the person may need to call each communication method separately, send a SMS or text message, or send an email in order to reach the group member.

In a system according to embodiments, the universal phone number 103 may be utilized for contacting one of the group members through a plurality of communication methods 112. In an example scenario, the universal phone number 103 may be acquired with the cloud based service. Members of the communication group 110 may assign a plurality of communication methods 112 to the universal phone number 103 in the cloud based service by providing contact information for each of the communication methods 112 such as phone numbers and email addresses. When assigning the communication method(s) to the universal phone number 103, the universal phone number 103 may be designated as the primary contact number for the communication group 110, and as such the "externally published" contact information for any of the members of the communication group 110. Email addresses and other internet communication methods may also be assigned to the universal phone number 103 as secondary contact information for receiving textual and/or message alerts and notifications.

The universal phone number 103 may be linked to the communication group 110 such that calling the universal phone number 103 may automatically route the incoming call to one or more of the communication methods 112 within the communication group 110. Routing the incoming call to the plurality of communication methods 112 within the communication group 110 may provide the ability for a group member to receive the incoming call at any communication method of the group member's choice. For example, an incoming call to the universal phone number 103 may ring on one, a few, or all of the communication methods 112 within the communication group 110. Upon one of the group members answering the call, others may receive a notification as to who accepted the call, who the caller is, and other comparable information. Additionally, the system may enable outbound calls by group members to be made via any of the plurality communication methods 112. The outbound calls may be routed through the cloud based service, and the universal phone number 103 may appear as the calling number on a caller identification system, maintaining secondary contact number privacy.

In an example embodiment, routing an incoming call to one or more communication methods 112 may be configured according to predefined rules. For example group members can configure how incoming calls are routed to specified communication methods 112 in the communication group 110. In an example scenario, the cloud based service may be configured to route an incoming call to all of the communication methods 112 in the communication group such that all of the communication methods 112 may ring upon receipt of the incoming call to the universal phone number 103 from a particular caller or at a particular time of day. In another example embodiment, only specified communication methods 112 may ring according to customization and predefined rules for the incoming call. For example, group members may specify that at specified times of the day, certain communication methods may be configured to receive the incoming call from the universal phone number 103. As an example, a group member may specify that Monday through Friday from 8:00 am to 5:00 am, all incoming calls may be routed to work phone 204, mobile device 206, and cellular phone 210. In an additional scenario, group members may specify that incoming calls from certain callers be routed to specified communication methods within the communication group. For example, certain contacts may call the universal phone number 103, such as family members, then the system may be configured to route the incoming call to all of the communication methods 112 at all times, but if anyone else calls the universal phone number after 8:00 pm, then the call may be routed directly to voicemail and no communication methods 112 may receive the call.

In a system according to embodiments, the system may enable sending alerts and/or notifications to group members that an incoming call has been answered at one of the communication methods. For example, when an incoming call to the universal phone number may be routed to two or more of the communication methods 112, one of the group members may answer the incoming call at one of the communication methods, such as the home phone 202. When the incoming call has been answered at the home phone 202, the system may be configured to notify the other communication methods 112 that the call has been answered. The system may notify the other communication methods 112 by sending a notification or alert as a text message (e.g. SMS) to one or more of the mobile devices configured to receive text messages. Additionally, if one or more email addresses 222 have been associated with the universal phone number 103, an email notification may be sent to the associated email addresses indicating that the incoming call was received. Additionally, the notification may be configured to specify which communication method and/or which group member answered the call.

In another example embodiment, if an incoming call is not answered at any of the communication devices 112 in the communication group 110, the system may create a missed call notification and may send the missed call notification to the communication methods 112 within the communication group 110 indicating that the incoming call was not answered. The alert may include call details such as when the incoming call was received and the identity of the caller. The notification may be sent to the communication methods 112 via text message, SMS to devices configured to receive text massages and email messages to one or more email addresses 222 within the communication group 110 that have been associated with the universal phone number 103.

In a system according to other embodiments, the system may enable a conference call scenario when two or more communication methods 112 answer an incoming call to the universal phone number 103. For example, two or more group members may accept an incoming call at two or more communication methods 112 simultaneously or within a configurable window (e.g., 10 seconds). The system may automatically enable a conference call scenario such that multiple group members may be connected on the same incoming call with the caller. The conference call scenario may be automatically initiated if more than one communication method is used to answer the incoming call. In another embodiment, the conference call scenario may be optional. The system may enable one of the answering group members to take priority to the call according to a predefined rule or according to user preference. Additionally, the system may enable one group member to invite another group member to join a call on another communication method within the group, initiating a conference call between group members In a system according to further embodiments, the cloud based service may provide a single universal voicemail box associated with the universal phone number 103. In a traditional calling scenario, if a call to the group member is not answered, then the caller may deposit a message or voicemail at each of the called communication methods, resulting in multiple nearly identical messages on multiple voicemail boxes for the group member to listen and respond to. In an example embodiment, the single universal voicemail box may be provided such that if an incoming call by a caller is not answered at any of the communication methods 112, the incoming call may be routed to the universal voicemail box provided by the cloud based service. The caller may leave one message in the universal voicemail box, rather than leaving multiple messages using the plurality of communication methods. The universal voicemail box may be accessible from any of the communication methods 112 within the communication group 110, and the group members may access the universal voicemail box to check voicemail messages using only a single number for access, minimizing the necessity for group members to remember multiple voicemail box numbers and passwords. The voicemail messages may be transcribed automatically to the set language of choice and the voicemail transcription along with the voicemail audio file may be emailed or the voicemail transcription can be sent via SMS/text.

In another example embodiment, text messages (e.g., short message service "SMS" or multi-media messaging service "MMS") may be forwarded to any of the communication methods 112 in the communication group 110 configured to received texts and/or other messages. Additionally, text messages may also be sent as email messages to configured email addresses within the communication group. Further, the system may be configured to enable group members to reply from one or more of the communication methods 112 routing the outbound text message through the cloud based service and the reply number for the outbound message may show up as originating from the universal phone number 103 rather than originating from the secondary contact number, maintaining privacy of contact numbers for each of the communication methods 112.

Figure 3:
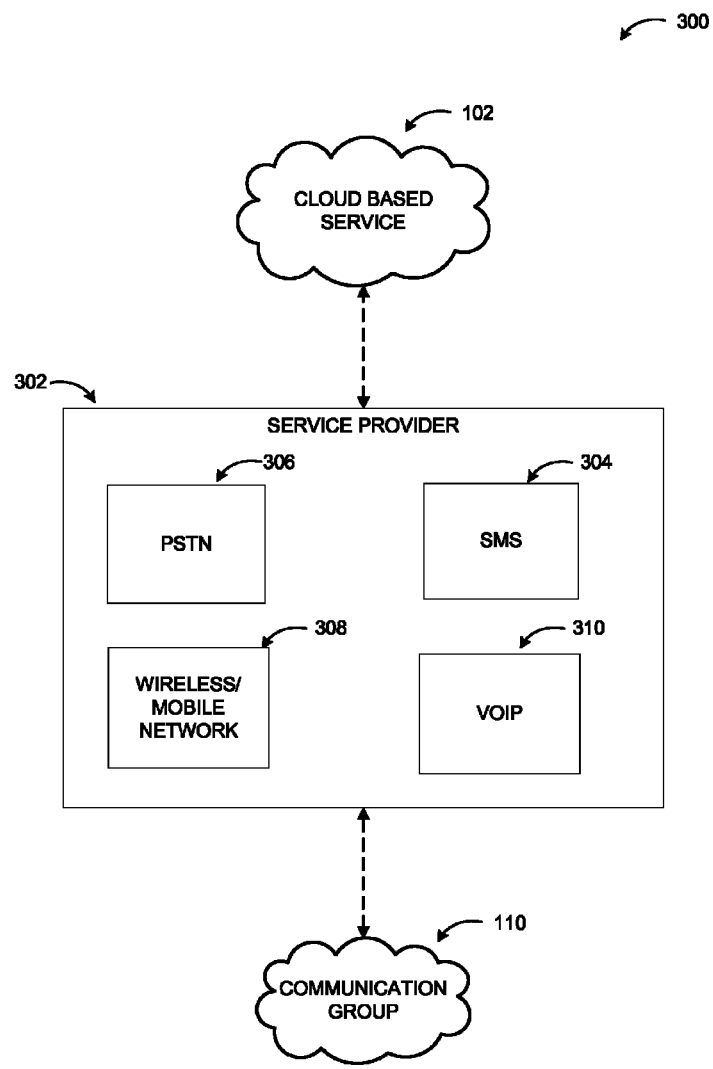
FIG. 3 illustrates an example service provider network for connecting a universal phone number to multiple members, according to embodiments.

FIG. 3 illustrates an example service provider network for connecting a universal phone number to a plurality of communication methods, according to embodiments. In a system according to embodiments, the cloud based service 102 may be connected with the communication group 110 over a service provider network 302 for routing incoming calls to telephony communication methods within the communication group 110. The service provider network 302 may enable connection with fixed line telephony devices such as a home phone or work phone over a PSTN system 306 within the service provider network 302. Additionally the service provider network 302 may enable connection of the universal phone number in the cloud based service 102 with mobile line devices over a wireless network 308, such as cellular phones, smart phones, PDAs and automobile consoles.

In an example embodiment, the service provider network 302 may also be configured to enable sending and receiving text messages 304 such as SMS and MMS to telephony devices in the communication group 110. The service provider network 302 may also be configured to enable connection of the universal phone number with internet communication methods such as VOIP 310. In a system according to embodiments, the cloud based service may also utilize a separate internet/email system outside of the service provider network 302 to connect directly to email addresses, internet communication methods and VOIP. For example, utilizing the internet/email system, the cloud based service 102 may be able send message alerts and notifications to an email address, voice over internet protocol (VOIP), and other internet communication methods within the communication group 110 that have been associated with the universal phone number 103.

The example systems in FIG. 1 through 3 have been described with specific configurations, applications, and interactions. Embodiments are not limited to systems according to these examples. A system for providing a universal phone number for connecting to a plurality of communication methods may be implemented in configurations employing fewer or additional components and performing other tasks. Furthermore, specific protocols and/or interfaces may be implemented in a similar manner using the principles described herein.

Figure 4:
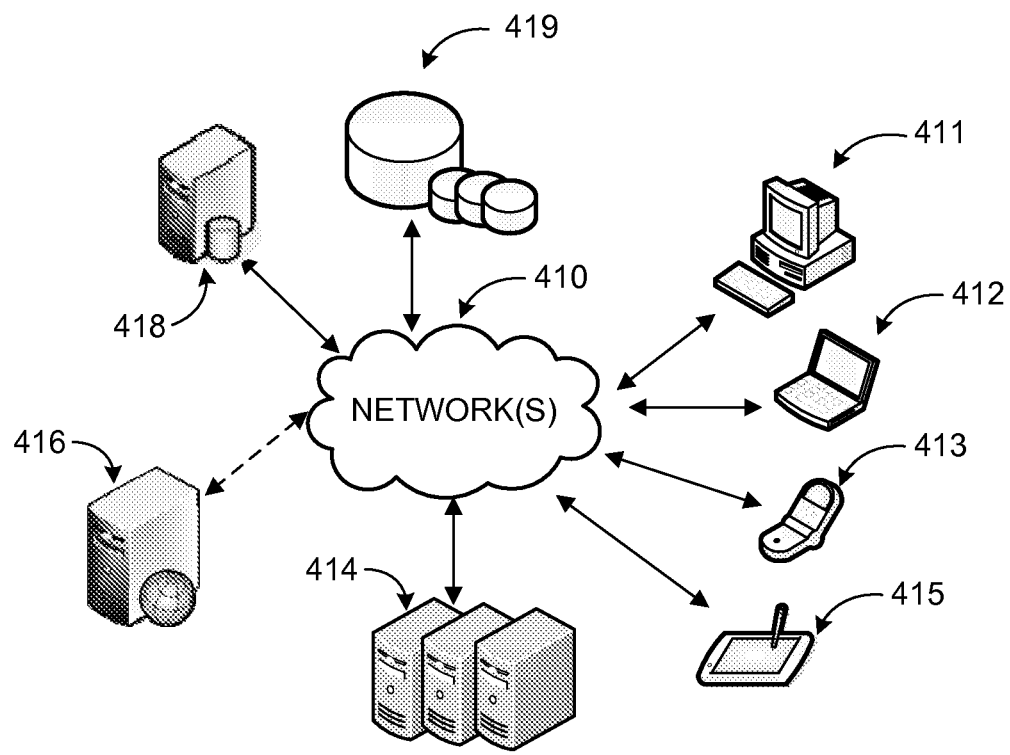
FIG. 4 is a networked environment, where a system according to embodiments may be implemented.

FIG. 4 is an example networked environment, where embodiments may be implemented. A system for providing a universal phone number for connecting to a plurality of communication methods may be implemented via software executed over one or more servers 414 such as a hosted service. The platform may communicate with client applications on individual computing devices such as a smart phone 413, a laptop computer 412, desktop computer 411, or tablet computer/slate 415 ('client devices') through network(s) 410.

Client applications executed on any of the client devices 411-413, 415 may facilitate communications via application(s) executed by servers 414, or on individual server 416. An application executed on one of the servers may facilitate generating a universal phone number in a cloud based service and assigning a plurality of communication methods to the universal number. Alternatively, the users may have a choice of selecting the number of their choice. The users may also be enabled to "port" their existing phone number from a service provider to this system. The application may designate the universal phone number as the primary contact number for the plurality of communication methods and may designate the contact information for each of the communication methods as secondary contact methods. The cloud based service may configure routing rules for routing incoming calls to the universal phone number to one or more of the plurality of communication methods according to predefined rules and/or according to the user's custom preferences. The application may retrieve relevant data from data store(s) 419 directly or through database server 418, and provide requested services (e.g. composing an email or SMS to a contact) to the user(s) through client devices 411-413, 415.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform providing a universal phone number for connecting to a plurality of communication methods. Furthermore, the networked environments discussed in FIG. 4 are for illustration purposes only. Embodiments are not limited to the example applications, modules, or processes.

Figure 5:
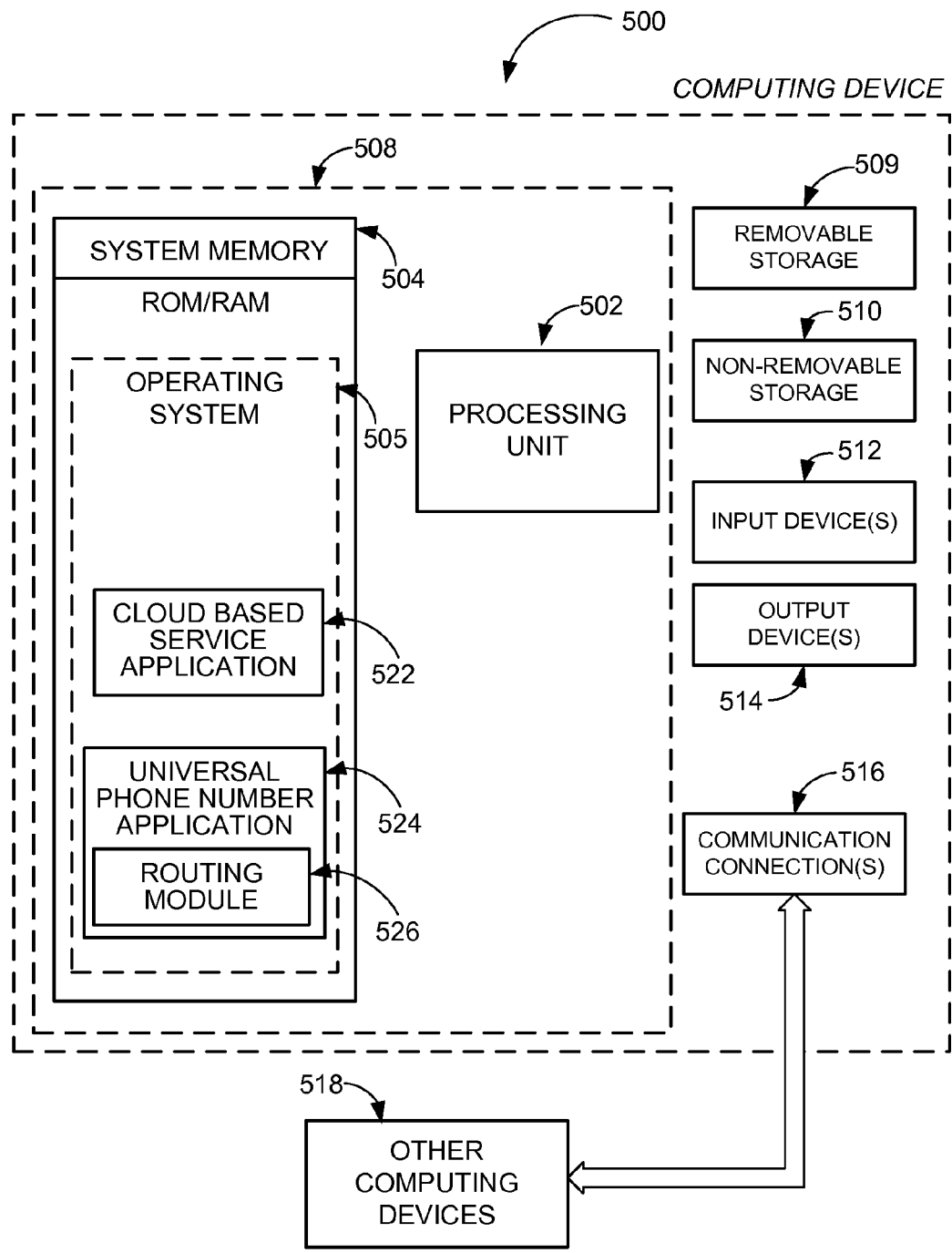
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing an application for providing a universal phone number for connecting to a plurality of communication methods according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as cloud based service application 522, universal phone number application 524, and routing module 526.

Cloud based service application 522 may provide a universal phone number for connecting to a plurality of communication methods and may also provide and host a universal voicemail box for receiving voicemail messages in a single location. Universal phone number application 524 may enable assigning of a plurality of communication methods, such as mobile phones, fixed line phones, internet phones and email addresses to the universal phone number. The universal phone number application 524 may designate the universal phone number as the primary contact information for the group of communication methods, and may designate contact information for the communication devices as secondary communication. The universal phone number application may keep the secondary contact information private. Routing module 526, which may be a distinct application of an integrated module of universal phone number application 524, may enable automatic routing of incoming calls to the universal phone number in the cloud based service to one or more of the plurality of communication methods according to predefined and/or user defined routing rules as discussed above. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
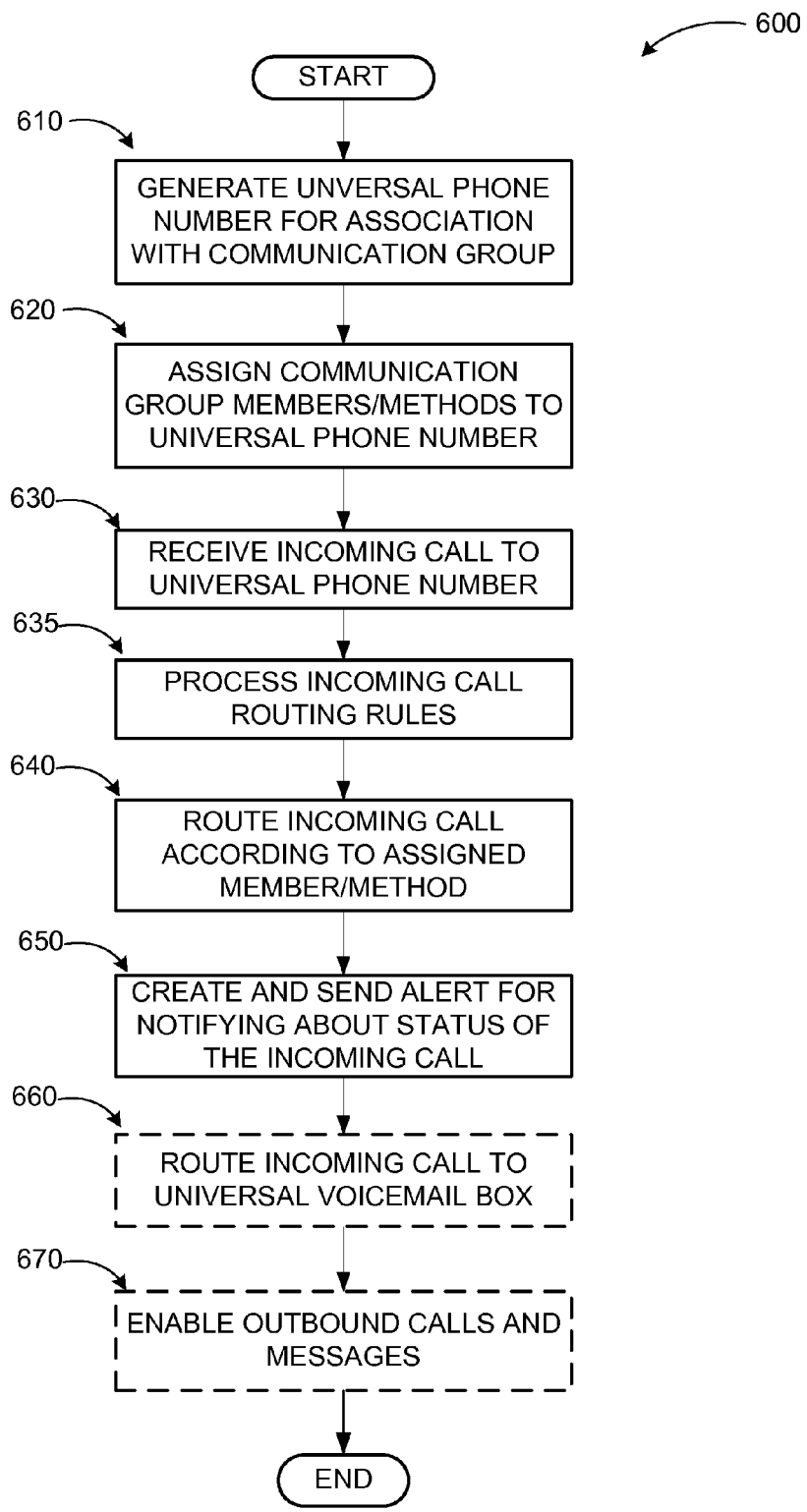
FIG. 6 illustrates a logic flow diagram for a process of providing a universal phone number for connecting to a group through a variety of communication methods, according to embodiments.

FIG. 6 illustrates a logic flow diagram for process 600 of providing a universal phone number for connecting to a plurality of communication methods according to embodiments. Process 600 may be implemented on a computing device or similar electronic device capable of executing instructions through a processor.

Process 600 begins with operation 610, where the system generates a pool of universal phone numbers and upon selection of a number from the pool by a user, associates the universal phone number with one or more communication methods in a communication group. At operation 620, the system may assign contact information for one or more of a plurality of communication methods in the communication group to the universal phone number in the cloud based service. The system may designate the universal phone number as the primary contact number for the communication group of communication methods. The system may further designate the contact information for the communication methods as secondary contact information. The system may keep the secondary contact information private from users outside of the communication group, such that only knowledge of the primary contact number, the universal phone number, may be required to be able to reach one or more of the communication methods.

At operation 630 the cloud based service may receive an incoming call to the universal phone number. At operation 635, routing rules for incoming calls (and/or for the specific incoming call such as one from a particular person) may be processed. The routing rules may be based on default rules, user-defined rules, or a combination. Upon receipt of the incoming call to the universal phone number at the cloud based service and processing of the routing rules, at operation 640 the cloud based service may automatically route the incoming call to one or more of the associated communication methods. Routing to the one or more communication methods may be configured according to predefined routing rules or user defined rules. At operation 650 the system may create and send an alert to the communication methods about the status of the incoming call. The alert may notify that the incoming call was answered at a certain communication method and/or by a particular group member. Further the alert may notify that the incoming call was not answered at any of the available communication methods. The alert may be a text message, SMS, MMS, email message. At optional operation 660, if the incoming call is not answered at any of the communication methods, the system may route the incoming call to a universal voicemail box provided by the cloud based service.

At optional operation 670 the system may enable outgoing calls and text messages by any of the communication methods. The outbound calls and outbound text messages may be routed through the cloud based service, and the system may maintain privacy on caller identification by providing the primary contact information (the universal phone number) as caller identification information on outbound calls and messages.

The operations included in process 600 are for illustration purposes. Providing a universal phone number for connecting to a plurality of communication method may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above.

Rather, the specific features and acts described above are disclosed as example forms of implementing the claims and embodiments.

What is claimed is:

1. A method executed at least in part in a computing device providing a universal phone number associated with a plurality of group members, the method comprising:
generating a group of universal phone numbers in a cloud based service;
enabling a communication group to select a universal phone number from the group of universal phone numbers;
associating the universal phone number in the cloud based service with members of the communication group;
assigning contact information for one or more communication methods in the communication group to the universal phone number in the cloud based service, wherein the universal phone number is designated as a primary contact number for the communication group to enable privacy of the contact information for the one or more communication methods;
receiving one or more rules for handling incoming communication to the universal phone number;
receiving an incoming communication request to the universal phone number; and
automatically routing the incoming communication request to the one or more communication methods associated with one or more members of the communication group according to at least one of the rules.

2. The method of claim 1, further comprising:
enabling the incoming communication request to be answered by a plurality of the members of the communication group; and
facilitating the communication as a conference call.

3. The method of claim 1, further comprising:
enabling the incoming communication request to be answered by one of the members of the communication group; and
providing a notification to other members of the communication group associated with the incoming communication request.

4. The method of claim 3, wherein the notification includes at least one from a set of: an identity of a caller associated with the incoming communication request, an identity of the member accepting the incoming communication request, a type of the incoming communication request, and a time of the incoming communication request.

5. The method of claim 3, wherein the notification is one of an email message, a text message, and an audio message.

6. The method of claim 1, further comprising:
transcribing a voicemail recorded as a result of an incoming call for one of the members of the communication group; and
forwarding the transcribed voicemail via one of an email message and a text message to a recipient of the voicemail, wherein a language of choice for the voicemail transcription is configurable by the recipient of the voicemail.

7. The method of claim 1, further comprising:
enabling an outbound communication request to be made by one or more of the members of the communication group;
routing the outbound communication request through the cloud based service; and
providing the universal phone number as contact identification information for the outbound communication request for maintaining a privacy of contact information for the requesting member.

8. The method of claim 1, further comprising:
forwarding the incoming communication request to a common voicemail box of the communication group for recording a voicemail; and
providing a notification to the members of the communication group associated with the recorded voicemail.

9. The method of claim 8, further comprising:
enabling the common voicemail box to be accessed using a single voicemail access number by the members of the communication group.

10. The method of claim 8, further comprising:
enabling at least one of the members of the communication group to define at least one rule associated with access to the common voicemail box and forwarding of notifications about recorded voicemails.

11. The method of claim 1, further comprising:
enabling at least one of the members of the communication group to select among a plurality of default rules for handling incoming communication requests.

12. The method of claim 1, further comprising:
enabling at least one of the members of the communication group to define at least one rule for handling incoming communication requests.

13. A server for providing a universal phone number associated with a plurality of group members within a cloud based service, the server comprising:
a memory storing instructions;
a processor coupled to the memory, the processor executing a cloud based communication application for providing the universal phone number, wherein the cloud based communication application is configured to:
generate the universal phone number;
associate the universal phone number in the cloud based service with members of a communication group;
receive one or more rules for handling incoming calls to the universal phone number;
receive an incoming communication request to the universal phone number;
automatically route the incoming communication request to one or more communication methods associated with one or more members of the communication group according to at least one of the rules;
in response to a determination that one or more of the group members accepts the incoming communication request, provide a notification to the members of the communication group that the incoming communication request has been accepted at the one or more communication methods, wherein the notification is configured to specify at least one of an identity of a caller associated with the incoming communication request, an identity of the one or more of the group members accepting the incoming communication request, a type of the incoming communication request, and a time of the incoming communication request;
in response to a determination that none of the group members accepts the incoming communication request, forward the incoming communication request to a common voicemail box of the communication group for recording a voicemail; and
provide another notification to the members of the communication group associated with the recorded voicemail.

14. The server of claim 13, wherein the cloud based communication application is further configured to:
enable the members of the communication group to initiate a communication session with a non-member of the communication group by providing the universal phone number as contact identification information for the members to maintain a privacy of contact information for an initiating member.

15. The server of claim 13, wherein at least a portion of the members of the communication group are associated with individual phone numbers and the incoming communication request is routed to one or more members' individual phone numbers through the universal phone number.

16. The server of claim 13, wherein the incoming communication request is routed to one or more from a set of: a mobile phone, a smart phone, a video phone, a landline phone, a cellular phone, a voice over Internet (VOIP) phone, and a computing device executing a communication application.

17. The server of claim 13, wherein the cloud based communication application is further configured to:
enable a member of the communication group in a communication session with a non-member of the communication group to invite another member of the communication group converting the communication session to a conference call.

18. A computer-readable memory device with instructions stored thereon for providing a universal phone number associated with a plurality of group members, the instructions comprising:
generating a universal phone number in a cloud based service;
associating the universal phone number in the cloud based service with members of a communication group;
assigning contact information for one or more communication methods in the communication group to the universal phone number in the cloud based service, wherein the universal phone number is designated as a primary contact number for the communication group to enable privacy of the contact information for the one or more communication methods;
determining one or more rules for handling incoming calls to the universal phone number from a plurality of default and user-defined rules;
receiving an incoming communication request to the universal phone number;
automatically routing the incoming communication request to the one or more communication methods associated with one or more members of the communication group according to at least one of the rules;
in response to a determination that one or more of the group members accepts the incoming communication request, provide a notification to the members of the communication group that the incoming communication request has been accepted at the one or more communication methods, wherein the notification is configured to specify at least one of an identity of a caller associated with the incoming communication request, an identity of the one or more of the group members accepting the incoming communication request, a type of the incoming communication request, and a time of the incoming communication request;
enabling an outbound communication request to be made by one or more of the members of the communication group;
routing the outbound communication request through the cloud based service; and
providing the universal phone number as contact identification information for the outbound communication request for maintaining a privacy of contact information for a requesting member.

19. The computer-readable memory device of claim 18, wherein the instructions further comprise:
enabling the incoming communication request to be routed to one or more selected members of the communication group based on at least one from a set of: an identity of an initiator of the incoming communication request, a time of the incoming communication request, and a type of the incoming communication request.

20. The computer-readable memory device of claim 19, wherein the type of the incoming communication request includes one of: a landline voice call, a voice over Internet (VOIP) call, a video call, a text message, an email message, a data sharing session, an application sharing session, and a whiteboard sharing session.

* * * * *